(12) United States Patent
Jackson

(10) Patent No.: US 12,030,733 B2
(45) Date of Patent: Jul. 9, 2024

(54) SYSTEM FOR OFFLOADING COVERED HOPPER RAILCAR

(71) Applicant: Ozinga Ready Mix Concrete, Inc., Mokena, IL (US)

(72) Inventor: Mark E. Jackson, Frankfort, IL (US)

(73) Assignee: OZINGA READY MIXCONCRETE, INC., Mokena (IL)

( * ) Notice: Subject to any disclaimer, the term of this patent is extended or adjusted under 35 U.S.C. 154(b) by 280 days.

(21) Appl. No.: 17/721,669

(22) Filed: Apr. 15, 2022

(65) Prior Publication Data

US 2023/0331500 A1 Oct. 19, 2023

(51) Int. Cl.
*B65G 67/24* (2006.01)
*B65G 65/46* (2006.01)

(52) U.S. Cl.
CPC .............. *B65G 67/24* (2013.01); *B65G 65/46* (2013.01)

(58) Field of Classification Search
None
See application file for complete search history.

(56) References Cited

U.S. PATENT DOCUMENTS

| | | | | |
|---|---|---|---|---|
| 1,822,530 A * | 9/1931 | Kind | ...................... | B65G 67/00 105/247 |
| 2,754,982 A * | 7/1956 | Hoffmeister | ......... | B65G 69/181 414/373 |
| 3,528,570 A * | 9/1970 | Pase | ......................... | B61D 7/30 414/373 |
| 3,802,584 A * | 4/1974 | Sackett, Sr. | ............ | B65G 65/00 198/538 |
| 3,951,278 A * | 4/1976 | Pase | .......................... | B66F 7/08 74/105 |
| 4,494,903 A * | 1/1985 | Badicel | .................. | B65D 88/32 414/574 |
| 4,553,898 A * | 11/1985 | Feterl | .................... | B65G 41/002 198/535 |
| 4,556,112 A * | 12/1985 | Theurer | ................ | E01B 27/105 198/577 |
| 4,909,699 A * | 3/1990 | Tandy | ..................... | E01B 27/02 198/606 |
| 4,963,066 A * | 10/1990 | Boppart | ................. | B65G 33/32 198/674 |
| 4,989,716 A * | 2/1991 | Stuckey | ................. | B65G 33/32 198/584 |
| 5,184,715 A * | 2/1993 | Feterl | .................... | A01C 15/003 198/667 |

(Continued)

FOREIGN PATENT DOCUMENTS

CN 204870679 U * 12/2015
RU 158279 U1 * 12/2015

*Primary Examiner* — Joseph A Dillon, Jr.
(74) *Attorney, Agent, or Firm* — Peter J. Van Bergen

(57) ABSTRACT

A system for offloading a covered hopper railcar includes first and second auger-based conveyors. The first conveyor is adapted to fit partially under a covered hopper railcar's offloading gate when the covered hopper railcar is at rest on track rails such that a portion of the first conveyor is located to a side of the track rails. The first conveyor has a first opening in a top thereof adapted to be coupled to the offloading gate, and has a second opening in the portion thereof located to the side of the track rails. The second opening is in a bottom of the first conveyor. The second conveyor is coupled to the second opening of the first conveyor.

23 Claims, 6 Drawing Sheets

(56) References Cited

U.S. PATENT DOCUMENTS

| | | | | |
|---|---|---|---|---|
| 5,302,071 A * | 4/1994 | Binzen | B65G 69/186 |
| | | | 414/373 |
| 6,471,031 B1 * | 10/2002 | Duncalf | B65G 67/24 |
| | | | 198/313 |
| 7,090,066 B2 * | 8/2006 | Kirsch | B65G 47/18 |
| | | | 414/572 |
| 7,252,039 B1 * | 8/2007 | Bosshart | B61D 7/32 |
| | | | 105/256 |
| 8,182,190 B2 * | 5/2012 | Ash | B61K 1/00 |
| | | | 414/373 |
| 8,556,066 B2 * | 10/2013 | Honegger | B65G 65/42 |
| | | | 198/671 |
| 8,821,100 B1 * | 9/2014 | Shaul | B65G 67/42 |
| | | | 414/327 |
| 8,991,585 B2 * | 3/2015 | Mast | B65G 67/24 |
| | | | 198/861.5 |
| 10,017,097 B2 * | 7/2018 | Ozinga | B65G 11/026 |
| 10,464,758 B2 * | 11/2019 | Wilcox | B65G 41/002 |
| 10,759,610 B1 * | 9/2020 | Allegretti | B65G 47/16 |
| 10,906,744 B2 * | 2/2021 | Grose | B65G 41/008 |
| 11,814,242 B2 * | 11/2023 | Hawkins | B65D 90/48 |
| 2011/0250038 A1 * | 10/2011 | Affleck | B65G 63/067 |
| | | | 414/800 |
| 2016/0121909 A1 * | 5/2016 | Herzog | E01B 27/00 |
| | | | 414/813 |

\* cited by examiner

SYSTEM FOR OFFLOADING COVERED HOPPER RAILCAR

The invention relates generally to bulk material handling systems, and more particularly to a system for offloading bulk material from a covered hopper railcar resting on a railroad track's rails.

BACKGROUND OF THE INVENTION

Covered hopper railcars are used to transport a variety of dry and moisture-sensitive bulk materials by rail. The bulk materials can include corn, wheat barley, rice, sugar, fertilizer, soda ash, cementitious materials, sand, and roofing granules.

In general, a covered hopper railcar has rigid sides and ends, a roof with watertight hatches, and a floor with gates that can be opened and closed. The inside of a covered hopper railcar is divided into bays having sloped floors where each bay's sloped floors lead to a gate. In operation, bulk material is loaded into a covered hopper railcar's bays via its rooftop hatches with its floor's gates in their closed configuration. After loading, the hatches are sealed to protect the bulk material from moisture intrusion. When the railcar is transported to its destination and the bulk material is to be offloaded, the gates are opened and the bulk material flows out of the railcar under the force of gravity. The flow of the bulk material out of a gate is generally handled by some type of offloading equipment.

Ideally, the offloading equipment used to handle the bulk material exiting a covered hopper railcar's gates should have a handling capacity that matches or exceeds the throughput capacity of the gates. Unfortunately, existing offloading systems used with covered hopper railcars do not achieve this goal thereby leading to time-consuming and, ultimately, costly offloading operations.

SUMMARY OF THE INVENTION

Accordingly, it is an object of the present invention to provide a system that can efficiently offload bulk material from a covered hopper railcar.

Other objects and advantages of the present invention will become more obvious hereinafter in the specification and drawings.

In accordance with the present invention, a system for offloading a covered hopper railcar includes first and second auger-based conveyors. The first auger-based conveyor is adapted to fit partially under a covered hopper railcar's offloading gate when the covered hopper railcar is at rest on track rails such that a portion of the first auger-based conveyor is located to a side of the track rails. The first auger-based conveyor has a first opening in a top thereof adapted to be coupled to the offloading gate. The first auger-based conveyor has a second opening in the portion thereof located to the side of the track rails. The second opening is in a bottom of the first auger-based conveyor. The second auger-based conveyor is coupled to the second opening of the first auger-based conveyor.

BRIEF DESCRIPTION OF THE DRAWINGS

Other objects, features and advantages of the present invention will become apparent upon reference to the following description of the preferred embodiments and to the drawings, wherein corresponding reference characters indicate corresponding parts throughout the several views of the drawings and wherein.

DETAILED DESCRIPTION OF THE INVENTION

Figure 1:
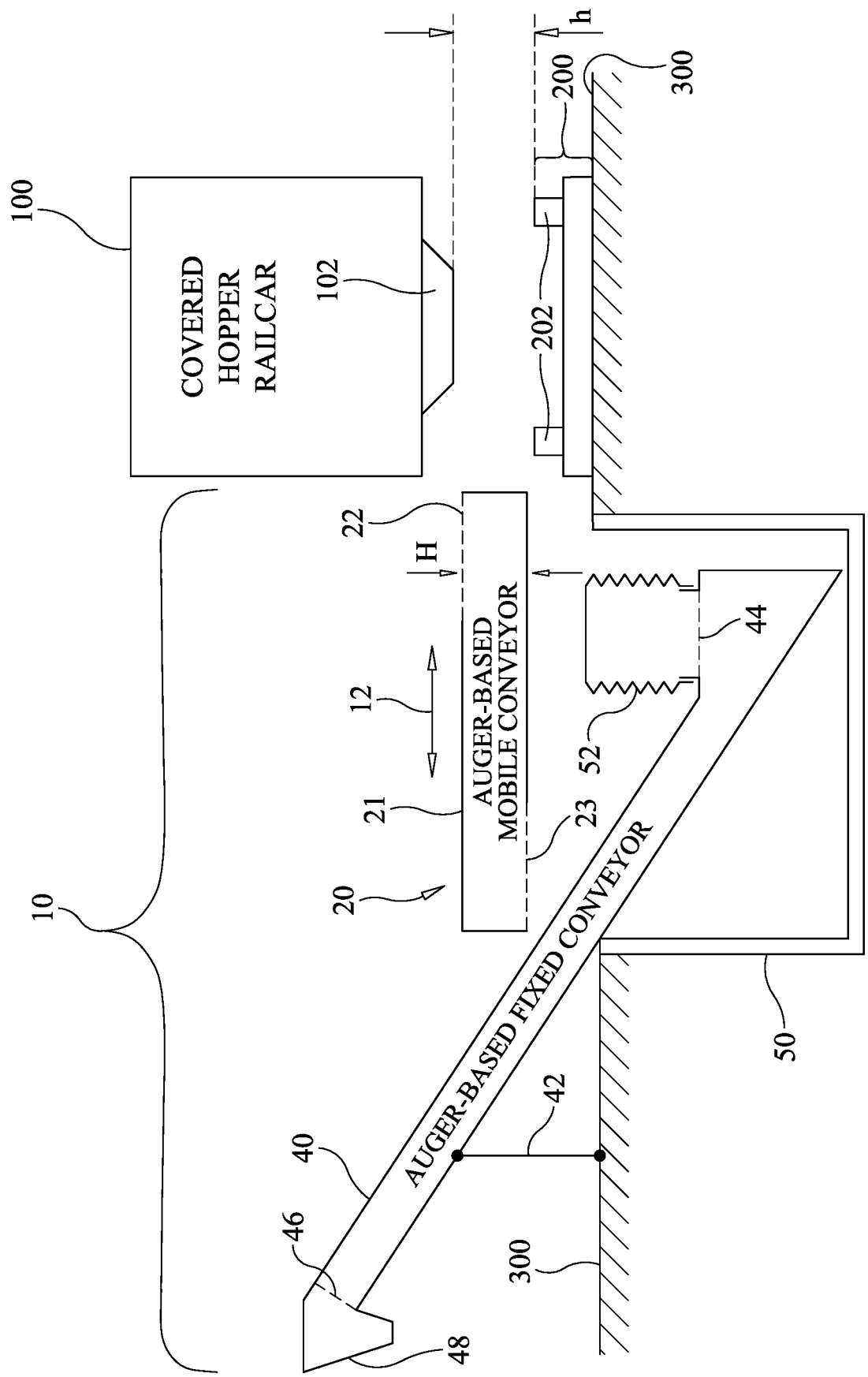
FIG. 1 is a schematic view of a system for offloading a covered hopper railcar illustrated in its pre-offloading state in accordance with an embodiment of the present invention.

Referring now to the drawings, simultaneous reference will be made to FIGS. 1 and 2 where a system for offloading a covered hopper railcar 100 in accordance with an embodiment of the present invention is shown and is referenced generally by numeral 10. System 10 is shown in its pre-offloading configuration in FIG. 1 and in its offloading configuration in FIG. 2.

Railcar 100 has the attributes of a conventional covered hopper railcar as would be well understood in the art. Briefly, railcar 100 has rigid sides, rooftop hatches for the purpose of loading railcar 100 with a dry bulk material, and multiple bottom gates for the purpose of offloading of the dry bulk material via gravity. Railcar 100 can be used to transport a variety of food and non-food dry bulk materials. By way of an illustrative example, system 10 will be described for its use in offloading dry cementitious materials from railcar 100. For clarity of illustration, the bulk material will not be shown in any of the figures.

For purpose of describing system 10, reference will be made to a single bottom gate 102 of railcar 100. However and as will be explained further below, some embodiments of the present invention can be adapted to simultaneously offload bulk material from multiple gates of a railcar in order to maximize offloading efficiency.

When railcar 100 is to be offloaded, railcar 100 is at rest on the rails 202 of a railroad track 200 disposed on a ground region 300. For clarity of illustration, the railcar's trucks and wheels are omitted from the figures. With railcar resting on rails 202, the bottom of gate 102 is spaced apart from the top of rails 202 by a distance "h" that is at its minimum when railcar 100 is fully loaded. Railcar 100 moves upward such that distance h increases as bulk material is offloaded from railcar 100. Distance h can increase by as much as 2 to 3 inches during an offloading operation.

System 10 includes at least one auger-based mobile conveyor 20 and at least one auger-based fixed conveyor 40. Each mobile conveyor 20 is movable between its pre-offloading position (FIG. 1) and its offloading position (FIG. 2) as indicated by two-headed arrow 12. Each mobile conveyor 20 is a self-contained unit housing at least one pair of augers (not shown in FIGS. 1 and 2) driven to rotation in order to transport bulk material exiting gate 102 to a position adjacent to railroad track 200 during an offloading operation as shown in FIG. 2. Since each mobile conveyor 20 is identically configured, it is sufficient to describe one mobile conveyor 20.

Mobile conveyor 20 includes a housing 21 whose height "H" is less than the distance h between gate 102 and the top of rails 202 when railcar 100 is fully loaded. The top of housing 21 has an opening at one end thereof indicated by dashed line 22. The bottom of the other end of housing 21 has an opening therein indicated by dashed line 23. When mobile conveyor 20 is positioned for offloading (FIG. 2), opening 22 is aligned with and coupled to gate 102, while opening 23 is located adjacent to track 200. Briefly, when mobile conveyor 20 is in its offloading position (FIG. 2), the augers in conveyor 20 are rotated. Gate 102 is opened and the bulk material in railcar 100 flows out of gate 102 and into housing 21 via opening 22. The bulk material entering housing 21 is transported to opening 23 where the bulk material exits housing 21 under the force of gravity.

Each auger-based fixed conveyor 40 is coupled to ground region 300 adjacent to track 200 by a support structure indicated generally by numeral 42. In general, fixed conveyor 40 is an enclosed structure housing an auger that receives bulk material at one end 44 as the bulk material exits the mobile conveyor's opening 23. Fixed conveyor 40 transports the received bulk material along the length of fixed conveyor 40 to its second end 46. Typically, the bulk material exiting second end 46 falls into a load spout 48 configured to support transfer of the bulk material to a ground-based vehicle, conveyor, etc., the choice of which is not a limitation of the present invention. In general, fixed conveyor 40 is configured to have a throughput capacity that is greater than that of mobile conveyor 20 in order to prevent clogs from developing between opening 23 of mobile conveyor 20 and end 44 of fixed conveyor 40.

Figure 2:
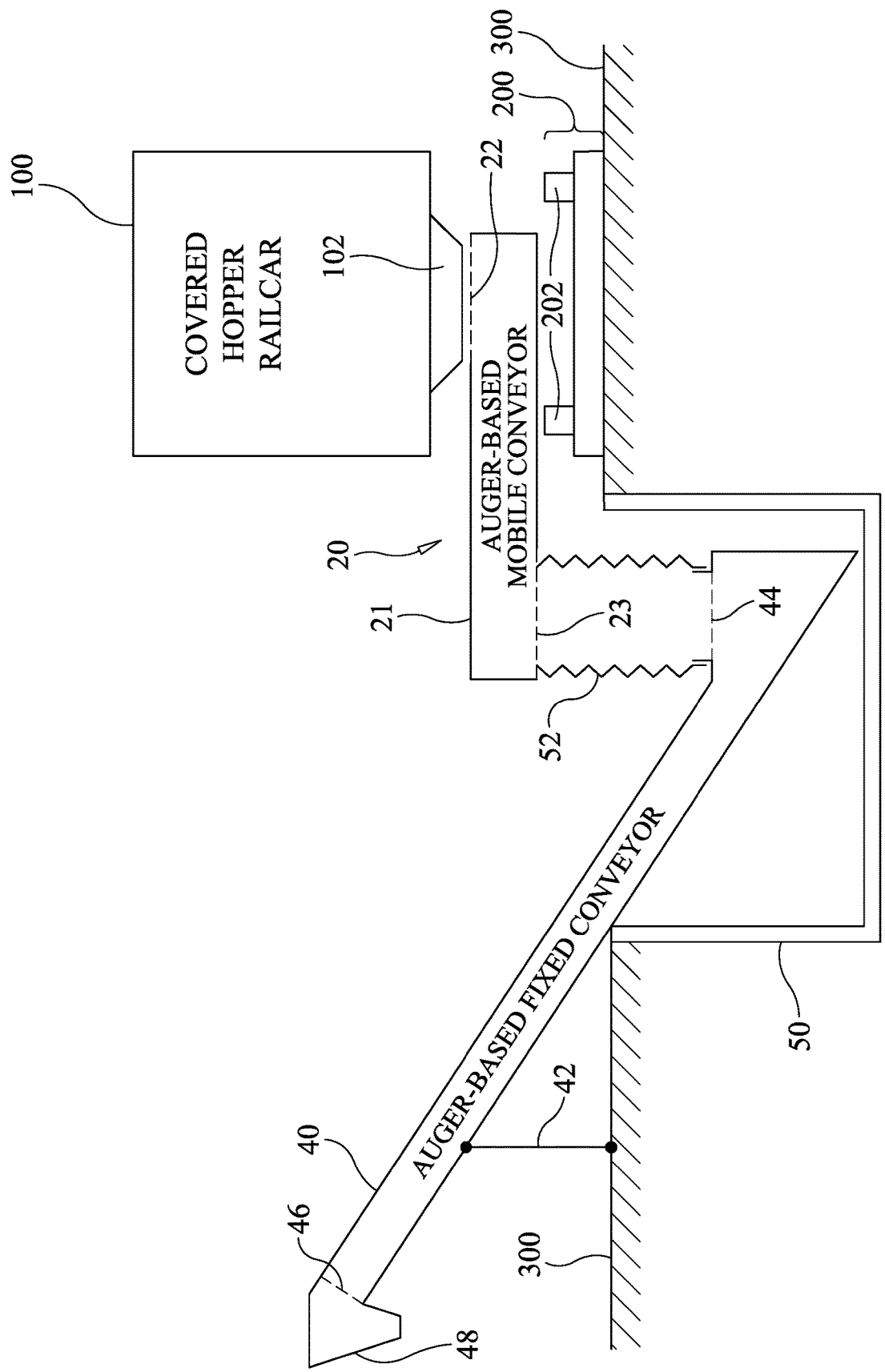
FIG. 2 is a schematic view of the system for offloading a covered hopper railcar shown in FIG. 1 illustrated in its offloading state.

In order to take advantage of the force of gravity acting on the bulk material exiting the mobile conveyor's opening 23, system 10 can include a rigid sleeve 50 countersunk into ground region 300 adjacent to track 200 such that end 44 of fixed conveyor 40 will be positioned beneath opening 23 during an offloading operation (FIG. 2). A movable and/or flexible sleeve 52 can be used to couple opening 23 to end 44 to accommodate movements of mobile conveyor 20 during an offloading operation as will be explained further below.

Figure 3:
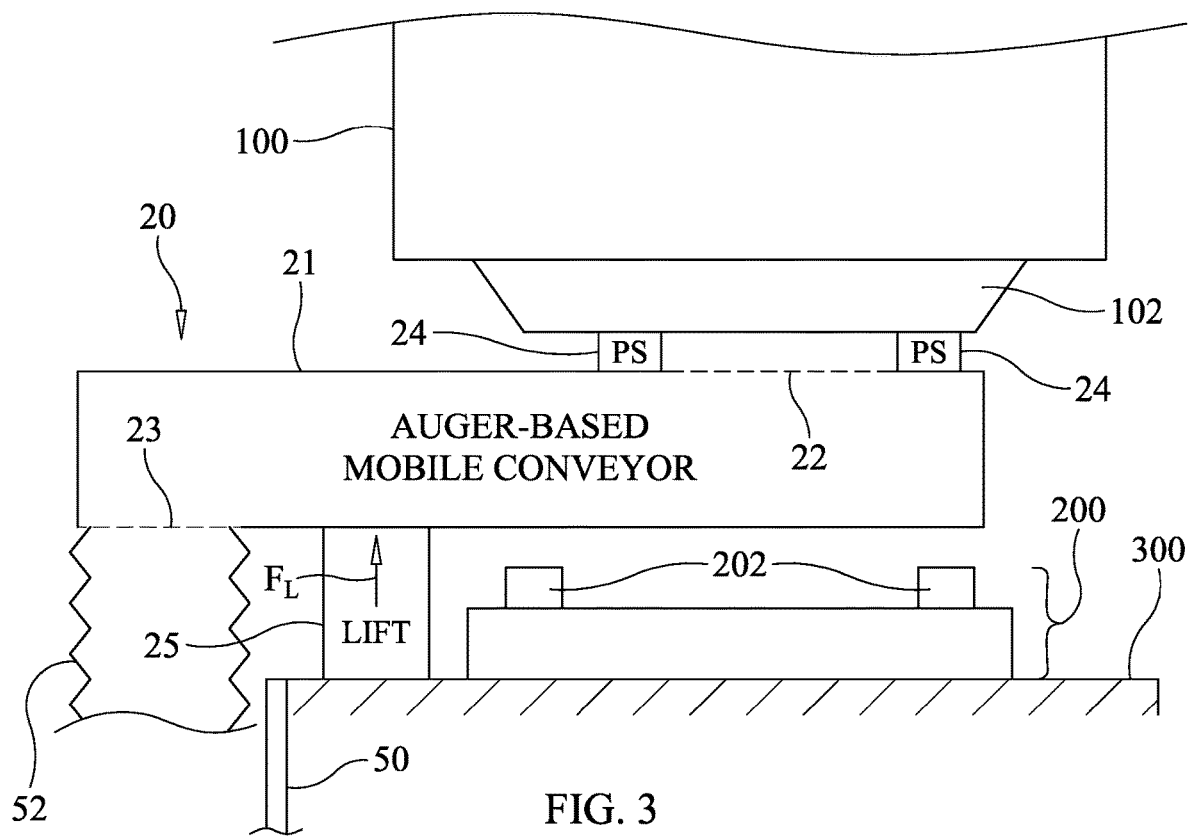
FIG. 3 is an isolated schematic view of the system's auger-based mobile conveyor equipped with an adaptive lift system in accordance with an embodiment of the present invention.

As mentioned above, the distance h between the bottom of gate 102 and the top of rails 202 increases as railcar 100 offloads its bulk material load. In order to keep opening 22 coupled to gate 102 as railcar 100 rises, the present invention can incorporate a lift that raises housing 21 in correspondence with the rise of railcar 100. For example and as shown in FIG. 3, one or more pressure sensors ("PS") 24 can be disposed between opening 21 and gate 102. When railcar 100 is fully loaded and opening 21 is coupled to gate 102, pressure sensor(s) 24 register a baseline pressure that is supplied to a lift 25 via a wired or wireless connection (not shown for clarity of illustration). The type of connection between pressure sensor(s) 24 and lift 25 is not a limitation of the present invention. As railcar 100 is offloaded and rises, pressure sensor(s) 24 will detect a decrease in pressure that is supplied to lift 25. In turn, lift 25 applies a lifting force F L to mobile conveyor 20 in order to maintain pressure at pressure sensor(s) 24 at the initial/baseline pressure. The inclusion of flexible sleeve 52 accommodates the above-described upward of movement of mobile conveyor 20.

Figure 4:
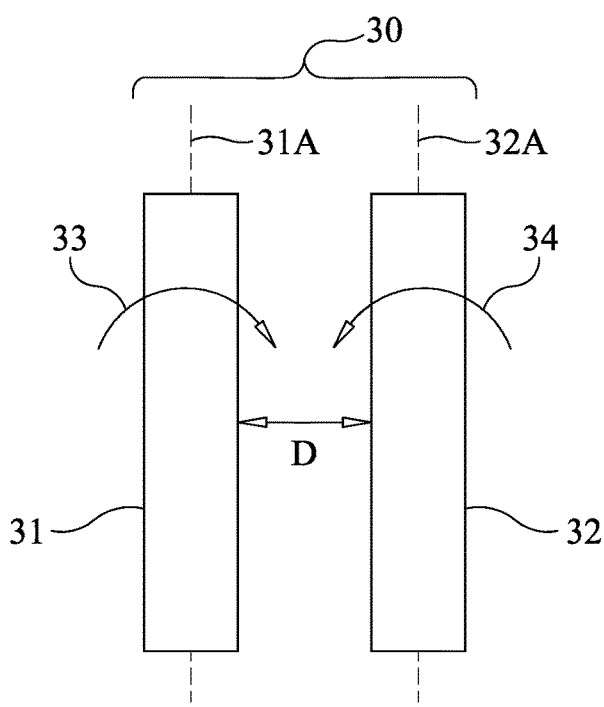
FIG. 4 is an isolated schematic view of a pair of augers for use in a mobile conveyor in accordance with an embodiment of the present invention.

As mentioned above, mobile conveyor 20 includes at least one pair of augers. Referring additionally now to FIG. 4, a single pair 30 of augers 31 and 32 is shown in isolation. Augers 31 and 32 are spaced apart from one another and are parallel to one another such that a constant gap "D" is maintained there between. Augers 31 and 32 are rotated about their respective longitudinal axes 31A and 32A in opposite directions 33 (e.g., clockwise) and 34 (e.g., counterclockwise) and at the same speed in order to drive material in gap D along the length of the augers. The size of gap D and the speed of rotation are selected based on the type of bulk material and required throughput.

Figure 5:
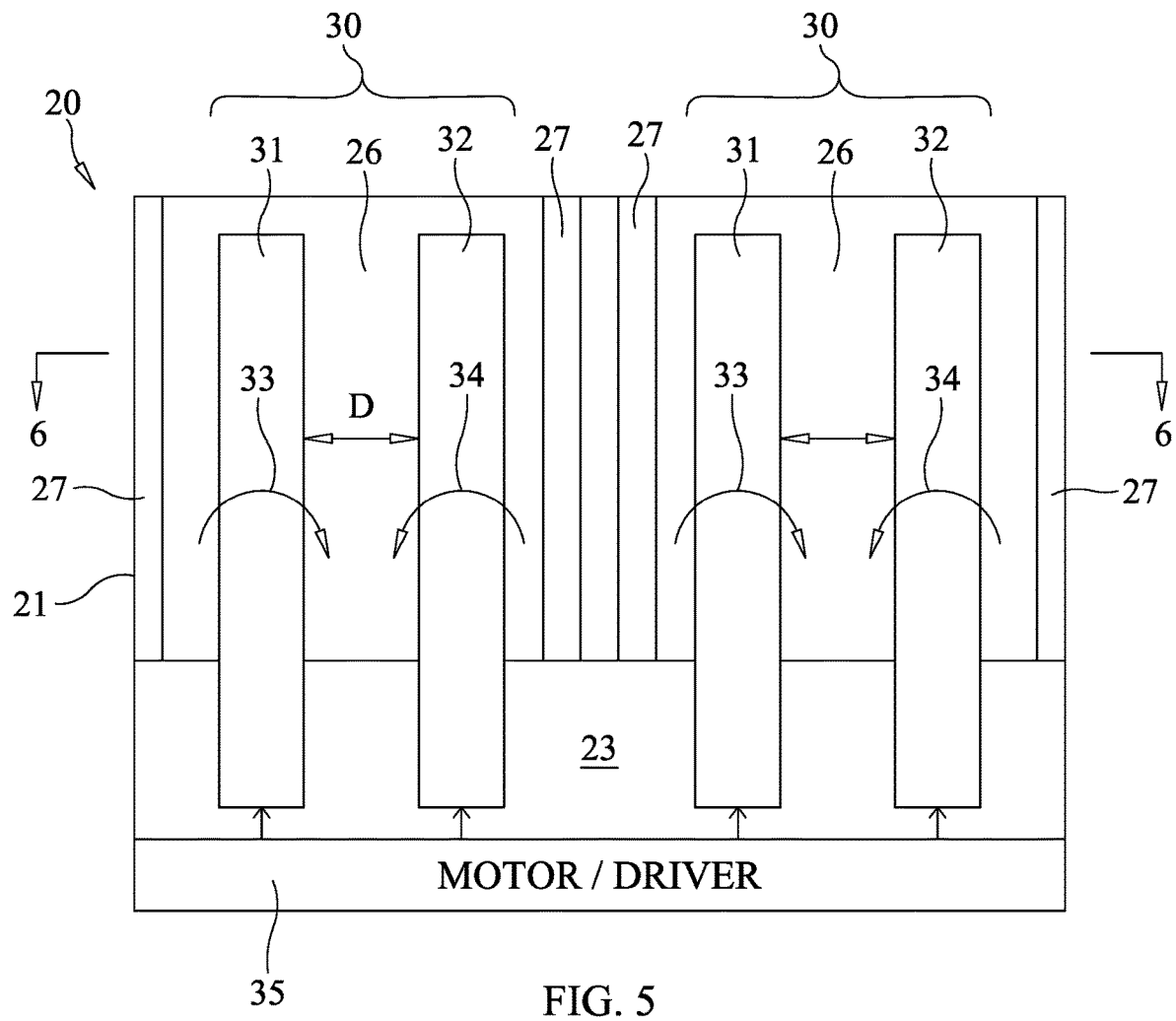
FIG. 5 is an isolated top plan view of an auger-based mobile conveyor with its top omitted to illustrate multiple pairs of augers in accordance with an embodiment of the present invention.
Figure 6:
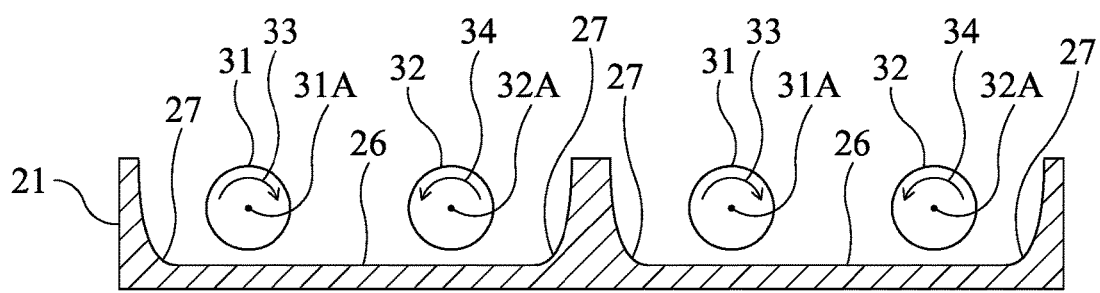
FIG. 6 is a cross-sectional view of the mobile conveyor housing taken along line 6-6 in FIG. 5 in accordance with an embodiment of the present invention.

In some embodiments of the present invention, multiple pairs of augers are provided in mobile conveyor 20. One such embodiment is illustrated in FIGS. 5 and 6 where two pairs 30 of augers 31/32 are provided in housing 21. In the top plan view shown in FIG. 5, the top of housing 21 is omitted in order to better illustrate the features of the embodiment. Each pair 30 of augers 31/32 is disposed in a bay 26 defined in and extending along the length of housing 21. Each pair 30 spans the opening in the top of housing 21 (i.e., opening 22 as described above but not shown in FIG. 5) and bottom opening 23. With additional reference to the cross-sectional view presented in FIG. 6, each bay 26 is trough-shaped along its length with its base or bottom corners 27 being concavely-curved along the length of bay 26 between openings 22 and 23. The radius of curvature of concavely-curved bottom corners 27 is selected to facilitate continued movement of the bulk material along the length of housing 21 as augers 31 and 32 are rotated.

Figure 7:
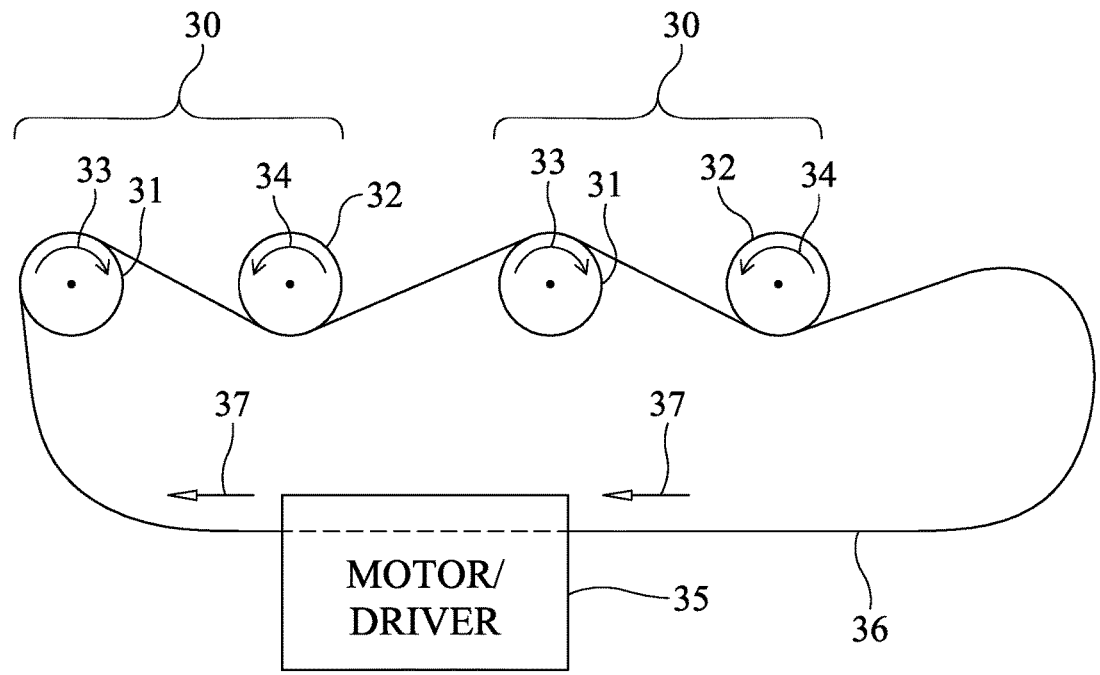
FIG. 7 is a schematic view of a single motor/driver coupled to multiple pairs of augers in accordance with an embodiment of the present invention.

Each auger 31 and 32 in both pairs 30 is simultaneously driven to an identical speed of rotation by a motor/driver 35 coupled to housing 21. Typically, motor/driver 35 is mounted to housing 21 at the end thereof nearest opening 23 located in the bottom of housing 21. In some embodiments of the present invention and as illustrated in FIG. 7, motor/driver 35 includes an endless belt 36 that is coupled to all augers 31 and 32 in a serpentine fashion to bring about the above-described counter rotations 33 and 34 when belt 36 is driven in a direction 37.

Figure 8:
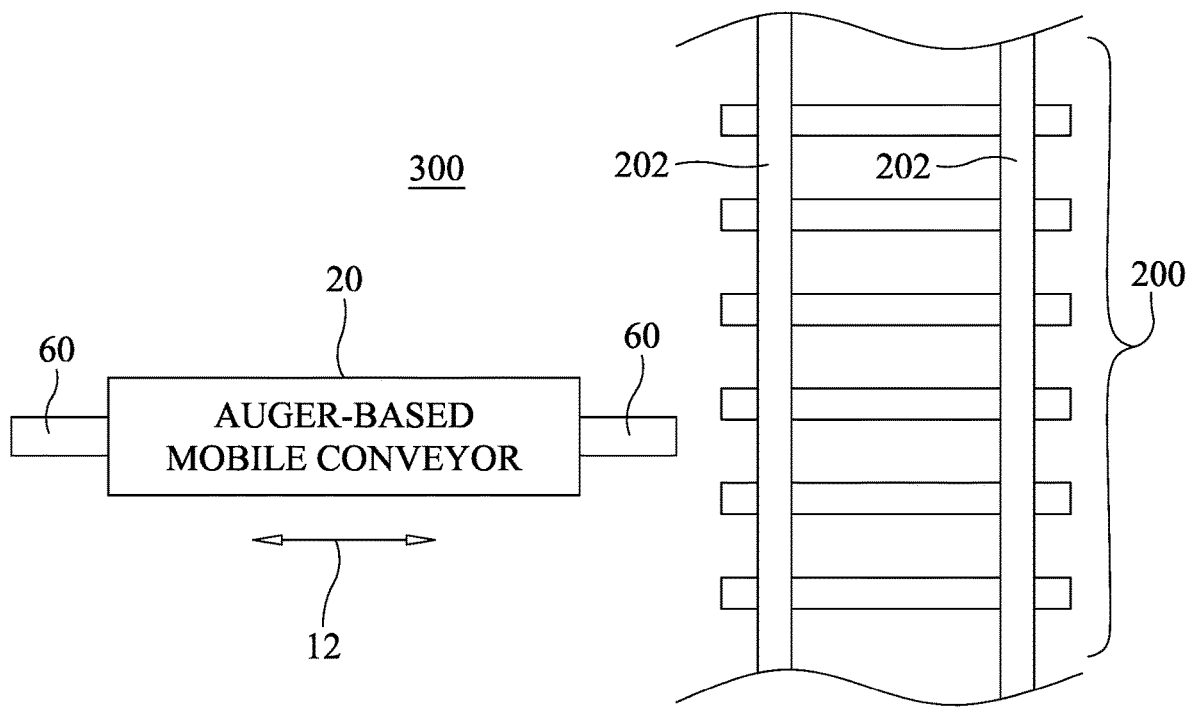
FIG. 8 is an isolated schematic view of an auger-based mobile conveyor mounted on ground-supported rails in accordance with an embodiment of the present invention.

As described above, mobile conveyor 20 must be movable between a pre-offloading state where it is clear of track 200 to an offloading state where it is partially disposed under railcar 100. To assure proper alignment with a railcar's gate, the system of the present invention can mount each mobile conveyor 20 on its own rail (or rails) fixed to the ground region adjacent to where the railcar is to be offloaded. For example and as illustrated in FIG. 8, mobile conveyor 20 is mounted for back-and-forth movement 12 along a rail (or rails) 60 that can be affixed to ground region 300 adjacent to track 200. Rail(s) 60 can be perpendicular to rails 202 of track 200. Movement of mobile conveyor 20 on rail(s) 60 can be a manual or mechanized operation without departing from the scope of the present invention.

Figure 9:
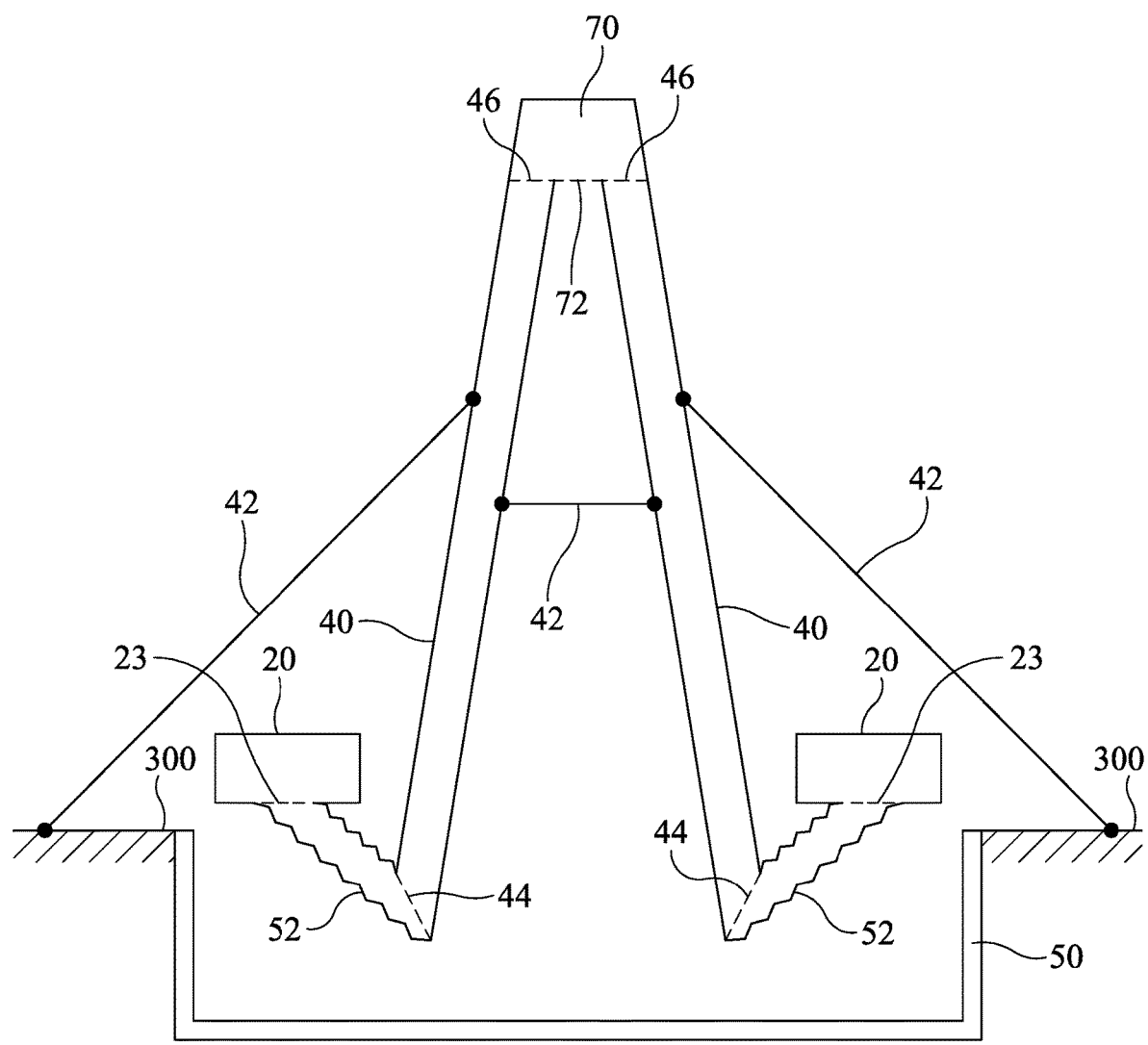
FIG. 9 is a schematic view of a system for simultaneously offloading multiple covered hopper railcar gates in accordance with another embodiment of the present invention.

As mentioned above, covered hopper railcars typically have multiple gates at the bottom thereof. To decrease or minimize offloading times, another embodiment of the present invention includes multiple mobile conveyors and multiple fixed conveyors. An example of this embodiment is illustrated in FIG. 9 where rigid sleeve 50 extends along a portion of a railroad track where a railcar (track and railcar not shown in FIG. 9 for clarity of illustration) is to be offloaded. The length of sleeve 50 should be long enough to accommodate the number of railcar gates that are to be simultaneously offloaded. Each mobile conveyor 20 is independently movable, incorporates the features described previously herein, and can be rail-mounted at the ground region as described above. Fixed conveyors 40 are coupled to one another and to ground region 300 by support 42. Each fixed conveyor 40 cooperates with one mobile conveyor 20 via a corresponding flexible sleeve 52 as previously described herein. Fixed conveyors 40 deposit their transported bulk material into a common repository 70 whose outlet 72 is configured as needed (e.g., an offloading spout) to support further transport of the bulk material.

The advantages of the present invention are numerous. The combination of mobile and fixed conveyors allows bulk material to be efficiently offloaded from a covered hopper railcar. The unique auger-based mobile conveyor moves dry bulk material (e.g., cementitious material) efficiently along its length. An adaptive lift system can be included to keep the mobile conveyor optimally positioned against a railcar's gate throughout an entire offloading operation. In some embodiments, the system is configured to simultaneously offload multiple gates of a covered hopper railcar to greatly reduce the time needed for an offloading operation.

Although the invention has been described relative to specific embodiments thereof, there are numerous variations and modifications that will be readily apparent to those skilled in the art in light of the above teachings. It is therefore to be understood that, within the scope of the appended claims, the invention may be practiced other than as specifically described.

What is claimed as new and desired to be secured by Letters Patent of the United States is:

1. A system for offloading a covered hopper railcar, comprising:
    a housing adapted to fit partially under a covered hopper railcar's offloading gate when the covered hopper railcar is at rest on track rails wherein a portion of said housing is located to a side of the track rails, said housing having a first opening in a top thereof adapted to be coupled to the offloading gate, said housing having a second opening in said portion of said housing, said second opening being in a bottom of said housing;
    at least one pair of augers mounted in said housing and extending from said first opening to said second opening;
    a motorized driver coupled to said housing and said at least one pair of augers for rotating augers in each pair of augers from said at least one pair of augers in opposite directions and at identical speeds; and
    a conveyor coupled to said second opening of said housing.

2. A system as in claim 1, further comprising a lift coupled to said housing for raising said housing in correspondence with any upward motion of the covered hopper railcar.

3. A system as in claim 1, further comprising:
    a pressure sensor for sensing a pressure between said first opening of said housing and the offloading gate; and
    a lift coupled to said pressure sensor for adjusting a height of said housing based on said pressure.

4. A system as in claim 1, further comprising:
    a rigid sleeve adapted to be countersunk into a ground region adjacent to the track rails, wherein a portion of said conveyor is disposed in said rigid sleeve; and
    a flexible sleeve coupled to said second opening of said housing and said portion of said conveyor.

5. A system as in claim 1, wherein said housing is adapted for movement along a ground region adjacent to the track rails, and wherein said conveyor is adapted to be fixed to the ground region.

6. A system as in claim 1, wherein said each pair of augers is disposed in a trough-shaped bay within said housing, said trough-shaped bay having concavely-curved corners extending between said first opening and said second opening.

7. A system for offloading a covered hopper railcar, comprising:
    a first auger-based conveyor adapted to fit partially under a covered hopper railcar's offloading gate when the covered hopper railcar is at rest on track rails wherein a portion of said first auger-based conveyor is located to a side of the track rails, said first auger-based conveyor having a first opening in a top thereof adapted to be coupled to the offloading gate, said first auger-based conveyor having a second opening in said portion thereof, said second opening being in a bottom of said first auger-based conveyor; and
    a second auger-based conveyor coupled to said second opening of said first auger-based conveyor, wherein a throughput capacity of said second auger-based conveyor is greater than a throughput capacity of said first auger-based conveyor.

8. A system as in claim 7, further comprising a lift coupled to said first auger-based conveyor for raising said first auger-based conveyor in correspondence with any upward motion of the covered hopper railcar.

9. A system as in claim 7, further comprising:
    a pressure sensor for sensing a pressure between said first opening of said first auger-based conveyor and the offloading gate; and
    a lift coupled to said pressure sensor for adjusting a height of said first auger-based conveyor based on said pressure.

10. A system as in claim 7, further comprising:
    a rigid sleeve adapted to be countersunk into a ground region adjacent to the track rails, wherein a portion of said second auger-based conveyor is disposed in said rigid sleeve; and
    a flexible sleeve coupled to said second opening of said first auger-based conveyor and said portion of said second auger-based conveyor.

11. A system as in claim 7, wherein said first auger-based conveyor is adapted for movement along a ground region adjacent to the track rails, and wherein said second auger-based conveyor is adapted to be fixed to the ground region.

12. A system as in claim 7, wherein said first auger-based conveyor includes pairs of augers, and wherein augers from each said pair of augers are parallel to one another.

13. A system as in claim 12, further comprising a motorized driver coupled to said pairs of augers for rotating augers in each of said pairs of augers in opposite directions and at identical speeds.

14. A system as in claim 7, wherein said first auger-based conveyor includes pairs of augers, wherein each of said pairs of augers is disposed in a trough-shaped bay within said first auger-based conveyor, and wherein said trough-shaped bay has concavely-curved base corners extending between said first opening and said second opening.

15. A system as in claim 7, wherein said first auger-based conveyor includes pairs of augers, wherein augers from each said pair of augers are parallel to one another, and wherein each of said pairs of augers is disposed in a trough-shaped bay within said first auger-based conveyor.

16. A system for offloading a covered hopper railcar, comprising:
- a plurality of auger-based mobile conveyors, each mobile conveyor from said mobile conveyors independently movable and adapted to fit partially under a covered hopper railcar having a plurality of offloading gates when the covered hopper railcar is at rest on track rails wherein a portion of said mobile conveyor is located to a side of the track rails, each said mobile conveyor having a first opening in a top thereof adapted to be coupled to one of the offloading gates, each said mobile conveyor having a second opening in said portion thereof and at a bottom thereof; and
- a plurality of auger-based fixed-position conveyors, each of said fixed-position conveyors adapted to be fixed to a ground region adjacent to the track rails where the covered hopper railcar is at rest, each of said fixed-position conveyors coupled to a corresponding one of said mobile conveyors at said second opening thereof.

17. A system as in claim 16, further comprising a lift coupled to each said mobile conveyor for raising said mobile conveyor in correspondence with any upward motion of the covered hopper railcar.

18. A system as in claim 16, further comprising for each said mobile conveyor:
- a pressure sensor for sensing a pressure between said first opening of said mobile conveyor and the one of the offloading gates; and
- a lift coupled to said pressure sensor for adjusting a height of said mobile conveyor based on said pressure.

19. A system as in claim 16, further comprising:
- a rigid sleeve adapted to be countersunk into the ground region adjacent to the track rails, wherein a portion of each of said fixed-position conveyors is disposed in said rigid sleeve; and
- a flexible sleeve coupled to said second opening of each said mobile conveyor and said portion of a corresponding one of said fixed-position conveyors.

20. A system as in claim 16, wherein each said mobile conveyor includes pairs of augers, and wherein augers from each said pair of augers are parallel to one another.

21. A system as in claim 20, further comprising a motorized driver coupled to said pairs of augers for rotating augers in each of said pairs of augers in opposite directions and at identical speeds.

22. A system as in claim 16, wherein each said mobile conveyor includes pairs of augers, wherein each of said pairs of augers is disposed in a trough-shaped bay within said mobile conveyor, and wherein said trough-shaped bay has concavely-curved base corners extending between said first opening and said second opening.

23. A system as in claim 16, wherein each said mobile conveyor includes pairs of augers, wherein augers from each said pair of augers are parallel to one another, wherein each of said pairs of augers is disposed in a trough-shaped bay within said mobile conveyor, and wherein said trough-shaped bay has concavely-curved base corners extending between said first opening and said second opening.

\* \* \* \* \*